US012638363B2

(12) United States Patent
Hildebrandt

(10) Patent No.: US 12,638,363 B2
(45) Date of Patent: May 26, 2026

(54) COMPUTER-IMPLEMENTED METHOD FOR CONFIGURING A VIRTUAL TEST SYSTEM AND TRAINING METHOD

(71) Applicant: dSPACE GmbH, Paderborn (DE)

(72) Inventor: Andre Hildebrandt, Paderborn (DE)

(73) Assignee: dSPACE GmbH, Paderborn (DE)

( * ) Notice: Subject to any disclaimer, the term of this patent is extended or adjusted under 35 U.S.C. 154(b) by 173 days.

(21) Appl. No.: 18/218,631

(22) Filed: Jul. 6, 2023

(65) Prior Publication Data

US 2024/0011871 A1    Jan. 11, 2024

(30) Foreign Application Priority Data

Jul. 11, 2022    (DE) ..................... 10 2022 117 160.4

(51) Int. Cl.
*G01M 17/007*        (2006.01)
*G07C 5/08*          (2006.01)

(52) U.S. Cl.
CPC ........... *G01M 17/007* (2013.01); *G07C 5/085* (2013.01)

(58) Field of Classification Search
CPC .. G01M 17/007; G07C 5/085; G06F 11/3698; G06F 30/15; G06F 30/20; G06F 30/27; G06F 2111/08; G06F 2111/20; G06F 18/217; G06F 11/3688; G06F 18/24; G05B 19/0426; G06N 20/00; G06N 3/08
See application file for complete search history.

(56) References Cited

U.S. PATENT DOCUMENTS

| | | | |
|---|---|---|---|
| 5,313,615 A | 5/1994 | Newman et al. | |
| 2019/0196925 A1* | 6/2019 | Ernst .................. | G06F 11/3672 |
| 2021/0026872 A1 | 1/2021 | Saillet et al. | |
| 2023/0162062 A1* | 5/2023 | Kiciman ............... | G06N 3/084 |
| | | | 703/13 |

FOREIGN PATENT DOCUMENTS

| | | |
|---|---|---|
| CN | 103140812 A | 6/2013 |
| CN | 111177307 A | 5/2020 |

OTHER PUBLICATIONS

Office Action for Chinese Patent Application No. 202310673122.6 mailed on Jun. 20, 2025.

* cited by examiner

*Primary Examiner* — Timothy P Graves
(74) *Attorney, Agent, or Firm* — Muncy, Geissler, Olds & Lowe, P.C

(57) ABSTRACT

A computer-implemented method for configuring a virtual test system for testing vehicle functions of a motor vehicle, wherein for each of the plurality of input ports of the artifact under test, an assignment of the output port having the highest confidence value of the at least one other artifact under test depending on a first condition, a compiling of a list of output ports having the highest confidence values depending on a second condition, or a non-assignment of an output port depending on a third condition for configuring a connection of the input ports of the artifact under test to appropriate output ports of the at least one other artifact under test is made. A computer-implemented method is also provided for providing a trained machine learning algorithm for configuring a virtual test system for testing vehicle functions of a motor vehicle.

15 Claims, 2 Drawing Sheets

S1',TD1

S2',TD2

S3',A2

COMPUTER-IMPLEMENTED METHOD FOR CONFIGURING A VIRTUAL TEST SYSTEM AND TRAINING METHOD

This nonprovisional application claims priority under 35 U.S.C. § 119(a) to German Patent Application No. 10 2022 117 160.4, which was filed in Germany on Jul. 11, 2022, and which is herein incorporated by reference.

BACKGROUND OF THE INVENTION

Field of the Invention

The present invention relates to a computer-implemented method for configuring a virtual test system for testing vehicle functions of a motor vehicle. The invention further relates to a computer-implemented method for providing a trained machine learning algorithm for configuring a virtual test system for testing vehicle functions of a motor vehicle.

Description of the Background Art

In PC-based simulation platforms for the validation of electronic control unit (ECU) software, which enable the simulation of a large number of different models—from functional models and networks of virtual ECUs to bus systems and vehicle models—the number of simulated artifacts and thus the effort required to configure the simulation system are constantly increasing.

In addition to bus communication, such PC-based simulation platforms also offer an exchange of data between the artifacts via ports. To do this, output ports must be connected to input ports between the artifacts. The number of such ports ranges from 100 to 10,000 ports per artifact.

In principle, there are two ways to configure the connections. On the one hand via a graphical user interface of the simulation platform, e.g., via "drag & drop" and on the other hand via automation through machine-readable lists.

Automation, e.g., via the names of the ports, is usually error-prone, since traditionally the names are slightly different. In both cases, the integration of a control unit into a simulation system leads to a significant effort.

As a result, there is a need to improve existing methods and systems for configuring a virtual test system for testing vehicle functions of a motor vehicle in such a way that an automated, user-friendly integration of the ECU into a simulation system is possible, which also reduces the time expenditure for the user and lowers consumption of computing resources.

SUMMARY OF THE INVENTION

It is therefore the object of the invention to provide a computer-implemented method for configuring a virtual test system for testing vehicle functions of a motor vehicle, which enables an automated, user-friendly integration of the ECU into a simulation system while at the same time reducing processing time for the user as well as computing resources.

According to the invention, the object is achieved by a computer-implemented method for configuring a virtual test system for testing vehicle functions of a motor vehicle.

The method involves providing a dataset comprising first data of a plurality of input ports of an artifact under test and comprising second data of a plurality of output ports of at least one other artifact under test.

Furthermore, the method involves applying a machine learning algorithm to the dataset, wherein for each of the plurality of input ports of the artifact under test, a confidence value is determined for each of the plurality of output ports of the at least one other artifact under test.

The method also includes, for each of the plurality of input ports of the artifact under test, assigning the output port of at least one other artifact under test having the highest confidence value depending on an initial condition, creating a list of the output ports having the highest confidence values depending on a second condition or not assigning an output port depending on a third condition in order to configure a connection of the input ports of the artifact under test to matching output ports of the at least one other artifact under test.

The invention further relates to a computer-implemented method for providing a trained machine learning algorithm for configuring a virtual test system for testing vehicle functions of a motor vehicle.

The method involves providing a first training dataset, comprising first data of a plurality of input ports of an artifact under test, and comprising second data of a plurality of output ports of at least one other artifact under test.

Further, the method involves providing a second training dataset comprising, for each of the plurality of input ports of the artifact under test, a confidence value for each of the plurality of output ports of the at least one other artifact under test.

The method also includes training the machine learning algorithm using an optimization algorithm that calculates an extreme value of a loss function, in particular using stochastic learning, to configure the virtual test system.

The invention further relates to a computer program containing program code to carry out at least one of the methods according to the invention when the computer program is executed on a computer.

In addition, the invention relates to a computer-readable medium containing program code of a computer program to carry out at least one of the methods according to the invention when the computer program is executed on a computer.

Machine learning algorithms are based on the fact that statistical methods are used to train a data processing system in such a way that it can perform a certain task without it being explicitly programmed to do so. The goal of machine learning is to construct algorithms that can learn from data and make predictions. These algorithms create mathematical models that can be used, for example, to classify data.

Such machine learning algorithms can be used, for example, when physical models, i.e., models based on physical conditions and/or dependencies, reach their limits, for example due to increased resource consumption.

An idea of the present invention is to support or automate the creation of the connections between the simulation artifacts through the use of the machine learning algorithm.

The machine learning algorithm, in particular a neural network, can be trained in such a way that the algorithm recognizes which input port belongs to which output port.

To do this, the algorithm uses both names and metadata (e.g., data type, unit, etc.). For each input, a list of suitable output ports can be created and a confidence value can be determined for each entry in the list that represents an estimated probability of wanting to connect the correct port.

In addition, a number of conditions are defined in the form of thresholds for the confidence value, from which various actions follow. If, for example, the confidence value is above an initial, configurable threshold, the algorithm connects the associated outputs with the appropriate inputs and logs the action in a list for the user.

If the confidence value is lower than the first threshold value but greater than a second threshold, the algorithm automatically suggests the appropriate connection that the user must accept. For example, all other suggestions can be displayed in a list and accepted or discarded by a user.

The solution according to the invention thus advantageously enables a simplification as well as a reduction of the time required to configure a simulation system. It also avoids the susceptibility to errors traditionally associated with the user manually creating port connections via a graphical user interface.

Applying the machine learning algorithm to the dataset, wherein for each of the plurality of input ports of the artifact under test a confidence value for each of the plurality of output ports of the at least one other artifact under test is determined, represents a classification of the output ports according to the confidence value assigned to each output port.

The confidence value relating to the classification indicates a probability for each output port of belonging to a specific input port, wherein the class that has the highest probability is selected, provided that the first condition is met, according to which a threshold value must at least be reached for an output port to be automatically assigned to a specific input port.

According to an example, the method also includes that the first condition can be met by the fact that if the confidence value is greater than or equal to a specified first threshold value, in particular greater than or equal to 99%, the output port with the highest confidence value of the at least one other artifact under test is automatically assigned.

Thus, a confidence value greater than or equal to 99% implies that the rest of the classification results, i.e., the remaining determined output ports are a maximum of 1% in total. Thus, it can be assumed that the relevant output port, quantified with a confidence value greater than or equal to 99%, is correct, so that the algorithm can automatically assign the output port to the appropriate input port.

The method can include that the second condition is met by the fact that if the confidence value is less than the specified first threshold value, in particular less than 99%, and greater than or equal to a specified second threshold value, in particular greater than or equal to 80%, a list of a predetermined number of output ports having the highest confidence values is created.

The advantage of creating a short list is that the output ports it contains can have a relatively high confidence value, so it can be assumed that one of the output ports is correct.

The method can also include that, based on the created list of a predetermined number, a user in particular can manually select the appropriate output port.

For the user, this results in the advantage of not having to analyze or compare a large number of possible output ports, but based on the pre-selection, only having to select the correct output port from a short list of output ports.

The method also can include that the confidence values included in the list are sorted by confidence value, in particular in ascending or descending order, and wherein the list includes confidence values which are lower than the specified first threshold value, in particular less than 99%, and greater than or equal to the specified second threshold value, in particular greater than or equal to 80%.

The sorting of the confidence values thus also advantageously simplifies the selection for the user, since it is likely that an output port with a high confidence value is correct. The user also has the option of not selecting any of the suggested output ports and rejecting the created list.

The method can include that the third condition is met by the fact that if the confidence value is less than the specified second threshold value, in particular less than 80%, no assignment of an output port is made.

Falling below the specified threshold value for the confidence value thus may mean that the classification result is discarded, since it is not possible to determine with sufficient probability which output ports are suitable.

This can be an advantageous way of reducing the frequency of errors in the selection of the output port, as unlikely results are discarded in advance.

The method can also include that the dataset further comprises third data of a large number of output ports of the artifact under test and fourth data of a plurality of input ports of at least one other artifact under test. The machine learning algorithm is thus able to perform the linking of output ports to input ports of a variety of artifacts.

The method can also include that the dataset contains data on all input ports and all output ports of the artifact under test and of the at least one other artifact under test, or includes a selection made or automatically proposed by a user of the input ports and output ports of the artifact under test and of the at least one other artifact under test.

The data contained in the dataset therefore allows for the machine learning algorithm to learn a function of assigning output ports to each of the input ports of a specified artifact.

According to another preferred development, the method includes that each assignment of an output port of the at least one other artifact under test to an input port of the artifact under test is logged in a log file.

This offers the advantage that the user can see afterwards what he or she has selected and what the algorithm has selected. The log file also contains which ports the algorithm has connected to each other. This allows for any errors to be identified and subsequently manually corrected.

The method can also include that the artifact under test and the at least one other artifact under test are a virtual ECU and/or environmental model of the vehicle.

Thus, after connecting the input ports with the appropriate output ports, the algorithm can perform a simulation of an ECU and/or an environmental model, in particular a software-based vehicle function such as adaptive cruise control.

The method can involve that the optimization algorithm calculates an assignment of output ports of the at least one other artifact under test using names, in particular alphabetic or alphanumeric designations, and/or metadata, in particular a data type, of the input ports of the artifact under test.

By using a plurality of data types and information sources, prediction accuracy can be advantageously increased when connecting the input ports to the appropriate output ports.

The method can involve that the confidence values of the second training dataset are less than a specified first threshold value, in particular less than 99%, and greater than or equal to a specified second threshold value, in particular greater than or equal to 80%.

The algorithm is thus advantageously trained using data which are highly likely to provide a correct classification result for identifying the appropriate output port.

The method can involve that the machine learning algorithm is trained based on the user accepting or not accepting an assignment carried out by the machine learning algorithm of an output port with a highest confidence value or accepting or not accepting a non-assignment of an output port of the at least one other artifact under test.

As a result, continuous user feedback can be used to further develop the algorithm and thus improve the accuracy of the algorithm or increase the hit rate.

The features of the method described herein are also applicable to other virtual environments, such as configuring other environmental models in different environments.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
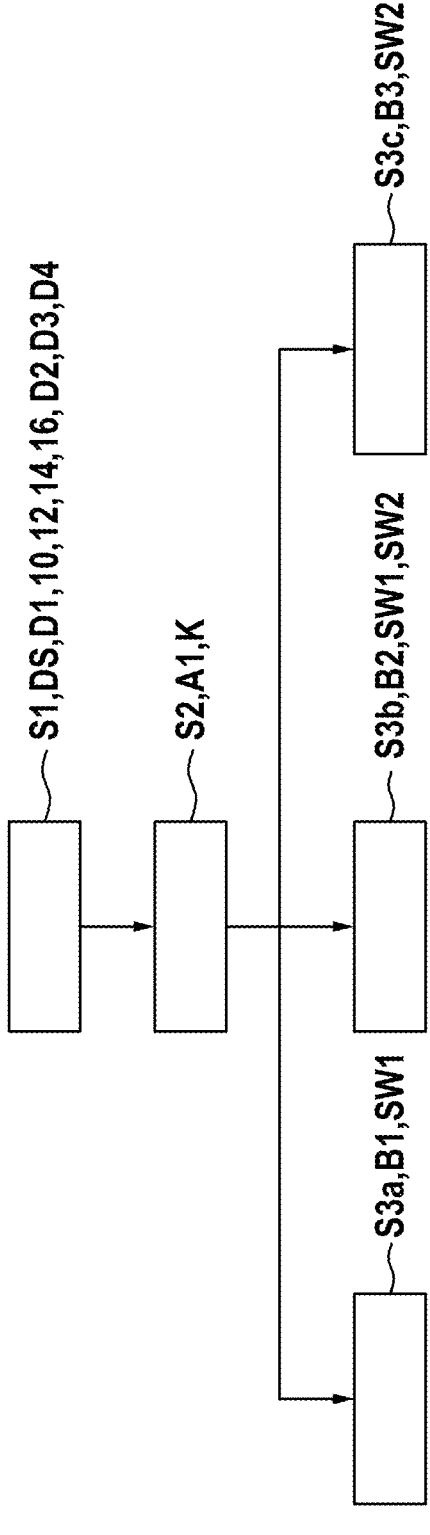
FIG. 1 is a flowchart of a computer-implemented method for configuring a virtual test system for testing vehicle functions of a motor vehicle according to a preferred embodiment of the invention.

The method shown in FIG. 1 comprises providing S1 a dataset DS comprising first data D1 of a plurality of input ports 10 of an artifact under test 12 and comprising second data D2 of a plurality of output ports 14 of at least one other artifact under test 16.

Furthermore, the method involves applying S2 a machine learning algorithm A1 to the dataset DS, wherein for each of the plurality of input ports 10 of the artifact 12 under test, a confidence value K is determined for each of the plurality of output ports 14 of the at least one other artifact 16 under test.

The method further includes, for each of the plurality of input ports 10 of the artifact 12 under test, assigning S3a the output port 14 having the highest confidence value K of the at least one other artifact 16 under test depending on a first condition B1, creating S3b a list of output ports 14 having the highest confidence values K depending on a second condition B2 or not assigning S3c an output port 14 depending on a third condition B3 in order to configure a connection of the input ports 10 of the artifact 12 under test to suitable output ports 14 of the at least one other artifact 16 under test.

The first condition B1 is met by the fact that if the confidence value K is greater than or equal to a specified first threshold value SW1, in particular greater than or equal to 99%, the output port 14 having the highest confidence value K of the at least one other artifact 16 under test is automatically assigned.

Further, the second condition B2 is met by the fact that if the confidence value K is less than the specified first threshold value SW1, in particular less than 99%, and greater than or equal to a specified second threshold value SW2, in particular greater than or equal to 80%, a list of a specified number of output ports 14 having the highest confidence values K is created.

Based on the compiled list of specified number, in particular a user can then manually select the appropriate output port 14.

The confidence values K included in the compiled list, especially in ascending or descending order, are sorted by confidence value K. The list also includes confidence values K which are less than the specified first threshold value SW1, in particular less than 99%, and greater than or equal to the specified second threshold value SW2, in particular greater than or equal to 80%.

The third condition B3 is met by the fact that if the confidence value K is less than the specified second threshold value SW2, in particular less than 80%, no assignment S3c of an output port 14 is carried out.

The dataset DS also contains third data D3 of a plurality of output ports 14 of the artifact 12 under test, and fourth data D4 of a plurality of input ports 10 of at least one other artifact 16 under test.

The dataset DS further includes data on all input ports 10 and all output ports 14 of the artifact 12 under test and of the at least one other artifact 16 under test, or a user-made or automatically suggested selection of input ports 10 and output ports 14 of the artifact 12 under test and of the at least one other artifact 16 under test.

Each assignment of an output port 14 of the at least one other artifact 16 under test to an input port 10 of the artifact 12 under test is logged in a log file. The artifact 12 under test and the at least one other artifact 16 under test are a virtual control unit of the motor vehicle. Alternatively, the artifact 12 under test and the at least one other artifact 16 under test can be given by an environmental model.

Figure 2:
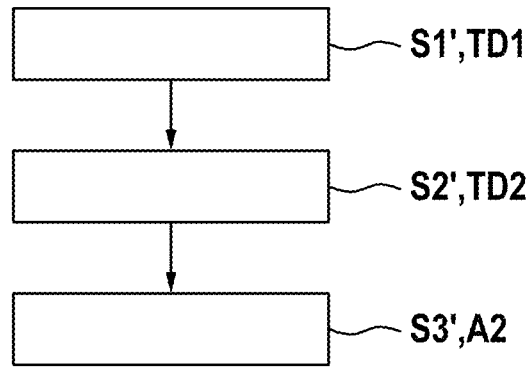
FIG. 2 is a flowchart of a computer-implemented method for providing a trained machine learning algorithm for configuring a virtual test system for testing vehicle functions of a motor vehicle according to the preferred embodiment of the invention.

FIG. 2 shows a flowchart of a computer-implemented method for providing a trained machine learning algorithm A1 for configuring a virtual test system for testing vehicle functions of a motor vehicle according to the preferred embodiment of the invention.

The method comprises providing S1' a first training dataset TD1, comprising first data D1 of a plurality of input ports 10 of an artifact 12 under test and comprising second data D2 of a plurality of output ports 14 of at least one other artifact 16 under test.

Furthermore, the method involves providing S2' a second training dataset TD2 comprising, for each of the plurality of input ports 10 of the artifact 12 under test, a confidence value K for each of the plurality of output ports 14 of the at least one other artifact 16 under test.

The method also includes training S3' the machine learning algorithm A1 using an optimization algorithm A2, which calculates an extreme value of a loss function, in particular using stochastic learning, in order to configure the virtual test system.

The optimization algorithm A2 calculates an assignment of output ports 14 of the at least one other artifact 16 under test using names, in particular alphabetic or alphanumeric designations, and/or metadata, in particular a data type of the input ports 10 of the artifact 12 under test.

The confidence values K of the second training dataset DS are less than a specified first threshold value, in particular less than 99%, and greater than or equal to a specified second threshold value SW2, in particular greater than or equal to 80%.

In addition to the first training dataset TD1 and the second training dataset TD2, the machine learning algorithm A1 is trained based on a user accepting or not accepting an assignment performed by the machine learning algorithm A1 of an output port 14 having a highest confidence value K or accepting or not accepting an assignment of an output port 14 of the at least one other artifact 16 under test.

Figure 3:
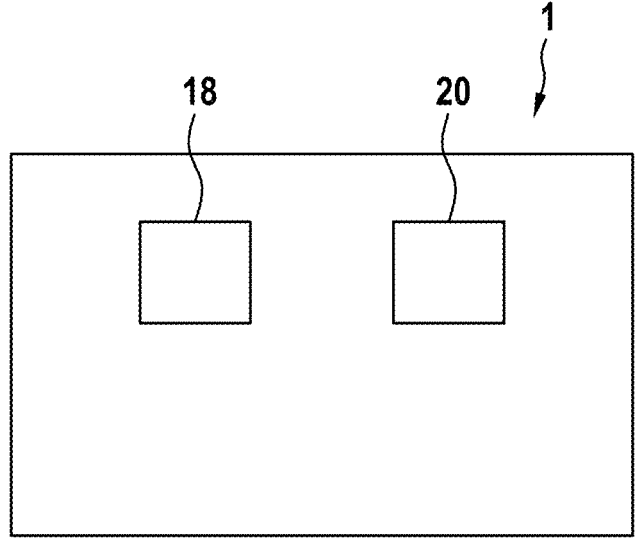
FIG. 3 is a schematic representation of a system for configuring a virtual test system for testing vehicle functions of a motor vehicle according to the preferred embodiment of the invention.

FIG. 3 shows a schematic representation of a system 1 for configuring a virtual test system for testing vehicle functions of a motor vehicle according to the preferred embodiment of the invention.

The system 1 comprises a data store 18 which is configured to provide a dataset DS comprising first data D1 of a plurality of input ports 10 of an artifact 12 under test and comprising second data D2 of a plurality of output ports 14 of at least one other artifact 16 under test.

Furthermore, the system 1 comprises a computational unit 20, which is configured to apply a machine learning algorithm A1 to the dataset DS, wherein for each of the plurality of input ports 10 of the artifact 12 under test, a confidence value K for each of the plurality of output ports 14 of the at least one further artifact 16 under test can be determined.

In addition, the system 1 includes that the computational unit 20 is further configured to perform the assignment, for each of the plurality of input ports 10 of the artifact 12 under test, of the output port 14 of the at least one other artifact 16 under test having the highest confidence value K depending on a first condition B1, a compiling of a list of output ports 14 having the highest confidence values K depending on a second condition B2, or a non-assignment of an output port 14 depending on a third condition B3 in order to configure a connection of the input ports 10 of the artifact 12 under test to suitable output ports 14 of the at least one other artifact 16 under test.

Although specific embodiments have been illustrated and described herein, it is understood by those skilled in the art that a variety of alternative and/or equivalent implementations exist. It should be noted that the exemplary embodiment or embodiments are only examples and are not intended to limit the scope, applicability or configuration in any way.

Rather, the above-mentioned summary and detailed description provides the skilled person with convenient instructions for the implementation of at least one exemplary embodiment, it being understood that various changes can be made in the range of functions and arrangement of the elements without deviating from the scope of the attached claims and their legal equivalents.

Generally, this application is intended to cover changes or adaptations or variations of the embodiments presented herein. For example, the sequence of the method steps can be changed. The method may also be carried out sequentially or in parallel, at least in sections.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A computer-implemented method for configuring a virtual test system for testing vehicle functions of a motor vehicle, the method comprising:

providing a dataset comprising first data of a plurality of input ports of an artifact under test and comprising second data of a plurality of output ports of at least one other artifact under test;

training a machine learning algorithm, the machine learning algorithm comprising a neural network, using stochastic learning, to configure the virtual test system;

applying the machine learning algorithm to the dataset;

determining, for each of the plurality of input ports of the artifact under test, a confidence value for each of the plurality of output ports of the at least one other artifact under test;

assigning, for each of the plurality of input ports of the artifact under test, the output ports having the highest confidence value of the at least one other artifact under test depending on a first condition;

compiling a list of the output ports having the highest confidence values depending on a second condition or a non-assignment of an output port depending on a third condition in order to configure a connection of the input ports of the artifact under test to suitable output ports of the at least one other artifact under test;

based on the list of the output ports manually selecting, by a user, appropriate output ports;

connecting the appropriate output ports to appropriate input ports;

after said connecting the appropriate input ports of the artifact under test to the appropriate output ports of the at least one other artifact under test, performing a simulation of a software-based vehicle function; and testing a vehicle function based on said simulation, wherein the machine learning algorithm is trained to recognize which input port belongs to which output port, and wherein the at least one other artifact under test is a virtual electronic control unit (ECU) integrated in a simulation system.

2. The computer-implemented method according to claim 1, wherein the first condition is met by the fact that if the confidence value is greater than or equal to a specified first threshold value or greater than or equal to 99%, and wherein the output port having the highest confidence value of the at least one other artifact under test is automatically assigned.

3. The computer-implemented method according to claim 2, wherein the second condition is met if the confidence value is less than the specified first threshold value or less than 99%, and greater than or equal to a specified second threshold value or greater than or equal to 80%, and wherein a list of a specified number of output ports having the highest confidence values is created.

4. The computer-implemented method according to claim 3, wherein a user manually selects the appropriate output port based on the compiled list of a specified number.

5. The computer-implemented method according to claim 3, wherein the confidence values included in the compiled list are sorted by the confidence values in ascending or descending order, and wherein the list includes confidence values which are less than the specified first threshold value or less than 99%, and greater than or equal to the specified second threshold value or greater than or equal to 80%.

6. The computer-implemented method according to claim 3, wherein the third condition is met if the confidence value is less than the specified second threshold value or less than 80%, and thereby no assignment of an output port is made.

7. The computer-implemented method according to claim 1, wherein the data set further comprises third data of a plurality of output ports of the artifact under test and fourth data of a plurality of input ports of at least of one other artifact under test.

8. The computer-implemented method according to claim 7, wherein the dataset contains data on all input ports and all output ports of the artifact under test and of the at least one other artifact under test or contains a user-made or automatically suggested selection of the input ports and output ports of the artifact under test and of the at least one other artifact under test.

9. The computer-implemented method according to claim 1, wherein each assignment of an output port of the at least one other artifact under test to an input port of the artifact under test is logged in a log file.

10. The computer-implemented method according to claim 1, wherein the artifact under test and the at least one other artifact under test are a virtual ECU and/or environmental model of the motor vehicle.

11. The computer-implemented method according to claim 1, wherein said training the machine learning algorithm comprises:

providing a first training dataset comprising first data of the plurality of input ports of the artifact under test and comprising second data of the plurality of output ports of the at least one other artifact under test;

providing a second training dataset comprising, for each of the plurality of input ports of the artifact under test, the confidence value for each of the plurality of output ports of the at least one other artifact under test; and training the machine learning algorithm.

12. The computer-implemented method according to claim 11, wherein the optimization algorithm calculates an assignment of output ports of the at least one other artifact under test using names, alphabetic, alphanumeric designations, and/or metadata or a data type of the input ports of the artifact under test.

13. The computer-implemented method according to claim 11, wherein the confidence values of the second training dataset are less than a specified first threshold value or less than 99%, and greater than or equal to a specified second threshold value or greater than or equal to 80%.

14. The computer-implemented method according to claim 11, wherein the machine learning algorithm is trained based on an acceptance or non-acceptance by a user of an assignment performed by the machine learning algorithm of an output port having the highest confidence value or a non-assignment of an output port of the at least one other artifact under test.

15. The computer-implemented method according to claim 1, wherein said software-based vehicle function is an adaptive cruise control.

\* \* \* \* \*